US010884696B1

(12) United States Patent
Willis et al.

(10) Patent No.: US 10,884,696 B1
(45) Date of Patent: Jan. 5, 2021

(54) DYNAMIC MODIFICATION OF AUDIO SIGNALS

(71) Applicant: Human, Incorporated, Seattle, WA (US)

(72) Inventors: Benjamin S. Willis, Bellevue, WA (US); Joseph David Dieter, Seattle, WA (US); Joshua Debner, Seattle, WA (US); Gelmont Rios, Seattle, WA (US); Kyle Marcolini, Seattle, WA (US); Brian Jackson, Seattle, WA (US)

(73) Assignee: Human, Incorporated, Seattle, WA (US)

(*) Notice: Subject to any disclaimer, the term of this patent is extended or adjusted under 35 U.S.C. 154(b) by 0 days.

(21) Appl. No.: 15/705,068

(22) Filed: Sep. 14, 2017

Related U.S. Application Data

(60) Provisional application No. 62/395,307, filed on Sep. 15, 2016.

(51) Int. Cl.
  *G06F 3/16* (2006.01)
  *H04R 29/00* (2006.01)
  *G10L 25/51* (2013.01)

(52) U.S. Cl.
  CPC .............. *G06F 3/165* (2013.01); *G10L 25/51* (2013.01); *H04R 29/00* (2013.01)

(58) Field of Classification Search
  None
  See application file for complete search history.

(56) References Cited

U.S. PATENT DOCUMENTS

| 4,052,720 A | 10/1977 | McGregor et al. |
| 4,455,677 A | 6/1984 | Fox |
| 4,517,415 A | 5/1985 | Laurence |
| 4,620,068 A | 10/1986 | Wieder |
| 4,881,123 A | 11/1989 | Chapple |
| 4,891,605 A | 1/1990 | Tirkel |
| 4,996,712 A | 2/1991 | Laurence et al. |

(Continued)

FOREIGN PATENT DOCUMENTS

| EP | 2 299 591 A1 | 3/2011 |
| WO | 99/12385 A1 | 3/1999 |

(Continued)

*Primary Examiner* — Kenny H Truong
(74) *Attorney, Agent, or Firm* — Seed IP Law Group LLP; Jared M. Barrett

(57) ABSTRACT

Systems and methods are directed to an audio computing device and methods for modifying and/or blending an ambient-sound signal and a non-ambient-sound signal together into a blended signal having one or more desirable characteristics. In some embodiments, the audio computing device may obtain an ambient sound signal by capturing ambient sound with a microphone. The audio computing device may also obtain a non-ambient sound signal that does not represent ambient sounds. The audio computing device may modify one or both of the sound signals to change properties of the sound signals based at least in part on contextual information related to the sound signals, the audio computing device, or the like. The audio computing device may then blend the modified signals together and cause the blended signal to be output as sound via a speaker that provides an improved audio experience for a user of the audio computing device.

19 Claims, 6 Drawing Sheets

(56) References Cited

U.S. PATENT DOCUMENTS

| | | |
|---|---|---|
| 5,125,032 A | 6/1992 | Meister et al. |
| 5,305,387 A | 4/1994 | Sapiejewski |
| 5,647,011 A | 7/1997 | Garvis |
| 6,061,456 A | 5/2000 | Andrea et al. |
| 6,415,034 B1 | 7/2002 | Hietanen |
| 6,447,461 B1 | 9/2002 | Eldon |
| 6,529,605 B1 | 3/2003 | Christoph |
| 6,731,767 B1 | 5/2004 | Blamey et al. |
| 6,840,908 B2 | 1/2005 | Edwards et al. |
| 6,944,474 B2 | 9/2005 | Rader et al. |
| 7,181,297 B1 | 2/2007 | Pluvinage et al. |
| 7,328,151 B2 | 2/2008 | Muesch |
| 7,529,545 B2 | 5/2009 | Rader et al. |
| 7,567,677 B1 | 7/2009 | Chan et al. |
| 7,903,825 B1 | 3/2011 | Melanson |
| 8,023,663 B2 | 9/2011 | Goldberg |
| 8,031,894 B2 | 10/2011 | Perkins et al. |
| 8,041,062 B2 | 10/2011 | Cohen et al. |
| 8,081,780 B2 | 12/2011 | Goldstein et al. |
| 8,112,166 B2 | 2/2012 | Pavlovic et al. |
| 8,121,325 B2 | 2/2012 | Atamaniuk et al. |
| 8,150,044 B2 | 4/2012 | Goldstein et al. |
| 8,270,629 B2 | 9/2012 | Bothra et al. |
| 8,379,871 B2 | 2/2013 | Michael et al. |
| 8,442,435 B2 | 5/2013 | Jones et al. |
| 8,498,426 B2 | 7/2013 | Bonanno |
| 8,532,715 B2 | 9/2013 | Zheng et al. |
| 8,798,693 B2 | 8/2014 | Cohen et al. |
| 8,804,974 B1 | 8/2014 | Melanson |
| 8,897,457 B2 | 11/2014 | Goldstein et al. |
| 9,087,506 B1 | 7/2015 | Kraft et al. |
| 9,131,308 B2 | 9/2015 | Kraft et al. |
| 9,197,971 B2 | 11/2015 | Michael et al. |
| 9,305,568 B2 | 4/2016 | Kraft et al. |
| 9,398,367 B1 | 7/2016 | Scott et al. |
| 9,412,356 B1 | 8/2016 | Baker et al. |
| 9,420,367 B2 | 8/2016 | Wiggins et al. |
| 9,524,731 B2 | 12/2016 | Kraft et al. |
| 9,557,960 B2 | 1/2017 | Kraft et al. |
| 9,560,437 B2 | 1/2017 | Jaffe et al. |
| 9,565,491 B2 | 2/2017 | Baker et al. |
| 9,584,899 B1 | 2/2017 | Klimanis et al. |
| 9,589,574 B1 | 3/2017 | Klimanis et al. |
| 9,648,436 B2 | 5/2017 | Kraft et al. |
| 9,654,861 B1 | 5/2017 | Klimanis et al. |
| 9,678,709 B1 | 6/2017 | Lanman, III et al. |
| 9,703,524 B2 | 7/2017 | Klimanis et al. |
| 9,736,264 B2 | 8/2017 | Kraft et al. |
| 9,747,282 B1 | 8/2017 | Baker et al. |
| 9,769,553 B2 | 9/2017 | Lanman, III et al. |
| 2002/0068986 A1 | 6/2002 | Mouline |
| 2002/0172350 A1 | 11/2002 | Edwards et al. |
| 2003/0070485 A1 | 4/2003 | Johansen et al. |
| 2003/0072455 A1 | 4/2003 | Johansen et al. |
| 2003/0073926 A1 | 4/2003 | Johansen et al. |
| 2003/0073927 A1 | 4/2003 | Johansen et al. |
| 2003/0078515 A1 | 4/2003 | Menzel et al. |
| 2003/0101215 A1 | 5/2003 | Puria et al. |
| 2003/0182000 A1 | 9/2003 | Muesch et al. |
| 2003/0223597 A1 | 12/2003 | Puria et al. |
| 2007/0189544 A1 | 8/2007 | Rosenberg |
| 2009/0180631 A1 | 7/2009 | Michael et al. |
| 2010/0040240 A1 | 2/2010 | Bonanno |
| 2010/0215198 A1 | 8/2010 | Ngia et al. |
| 2011/0026737 A1* | 2/2011 | Park .................. G06F 3/165 381/104 |
| 2012/0087516 A1 | 4/2012 | Amin |
| 2012/0281856 A1 | 11/2012 | Georgiou et al. |
| 2013/0238341 A1* | 9/2013 | You ..................... G10L 25/48 704/275 |
| 2014/0126734 A1* | 5/2014 | Gauger, Jr. ............ H04R 3/002 381/71.6 |
| 2015/0222977 A1 | 8/2015 | Angel, Jr. |
| 2015/0280669 A1* | 10/2015 | Vilermo ............... H04R 1/1041 381/107 |
| 2015/0294662 A1 | 10/2015 | Ibrahim |
| 2015/0364137 A1* | 12/2015 | Katuri ................... G10L 15/20 704/233 |
| 2015/0382106 A1 | 12/2015 | Kraft et al. |
| 2017/0048616 A1 | 2/2017 | Kraft et al. |
| 2017/0099538 A1 | 4/2017 | Kraft et al. |
| 2017/0103745 A1 | 4/2017 | Baker et al. |
| 2017/0105064 A1 | 4/2017 | Jaffe et al. |
| 2017/0142512 A1 | 5/2017 | Klimanis et al. |
| 2017/0195777 A1 | 7/2017 | Klimanis et al. |
| 2017/0269901 A1 | 9/2017 | Klimanis et al. |

FOREIGN PATENT DOCUMENTS

| | | |
|---|---|---|
| WO | 2008/086112 A1 | 7/2008 |
| WO | 2008/138349 A2 | 11/2008 |
| WO | 2009/089353 A1 | 7/2009 |
| WO | 2017/035636 A1 | 3/2017 |

* cited by examiner

DYNAMIC MODIFICATION OF AUDIO SIGNALS

RELATED APPLICATIONS

This application claims priority to U.S. Provisional Application No. 62/395,307 entitled "DYNAMIC MODIFICATION OF AUDIO SIGNALS," filed on Sep. 15, 2016, the entire contents of which is hereby incorporated by reference.

BACKGROUND

Some audio systems—such as headphones or earphones—include speaker elements that are worn near users' ears. These speaker elements may output audio at a volume that may make it difficult or impossible for users to hear ambient sounds. Users of such audio computing devices frequently experience reduced awareness of events occurring around them. For example, a user that is listening to music with headphones while walking down the street may be unaware of a vehicle that is approaching the user from behind. Some current audio computing devices enable users to lower the volume of audio play from these devices. Because these audio computing devices rely on the users to determine when to adjust the volume, users must maintain a nearly constant awareness of their surroundings so that they may determine the extent to which to adjust the volume of the audio computing devices. Thus, providing the user of an audio computing device with situational awareness while minimizing or eliminating the user's need to actively participate in the adjustment of the audio computing device's volume remains an import technical challenge.

SUMMARY

Various embodiments provide for a computer-implemented method implemented on an audio computing device. In some embodiments, the method may include obtaining an ambient-sound signal, obtaining a non-ambient-sound signal, determining contextual information related to the ambient-sound signal and the non-ambient-sound signal, identifying—from a set of modification rules and based at least in part on the contextual information—a first set of modifications related to the ambient-sound signal, identifying—from the set of modification rules and based at least in part on the contextual information—a second set of modifications related to the non-ambient-sound signal, generating a blended signal using at least the first set of modifications, the second set of modifications, the ambient-sound signal, and the non-ambient-sound signal, causing output of the blended signal, determining that a user input has been received by the audio computing device during output of the blended signal wherein the user input causes a modification to the output of the blended signal, and generating a modified set of modification rules based at least in part on the modification to the output of the blended signal, the contextual information, and the set of modification rules. In some embodiments, the contextual information may include information regarding at least one of a characteristic of the ambient-sound signal, a characteristic of the non-ambient-sound signal, sensor information obtained from at least one sensor of the audio computing device, operational information regarding an operating state of the audio computing device, or network information regarding a state or condition of a network to which the audio device is connected.

In some embodiments, the user input may include a voice command included in the ambient-sound-signal. In some embodiments, obtaining the ambient-sound signal may include obtaining the ambient-sound signal using a microphone of the audio computing device, and obtaining the non-ambient-sound signal may include obtaining the non-ambient-sound signal from at least one of an internal memory of the audio computing device or an external computing device. In some embodiments, identifying the set of modifications may include providing the contextual information to an external computing device and receiving the set of modifications from the external computing device.

In some embodiments, the computer-implemented method may also include determining updated contextual information based at least in part on the contextual information, identifying, from the modified set of modification rules and based at least in part on the updated contextual information, a third set of modifications related to the ambient-sound signal, identifying, from the modified set of modification rules and based at least in part on the updated contextual information, a fourth set of modifications related to the non-ambient-sound signal, and generating another blended signal using at least the third set of modifications, the fourth set of modifications, the ambient-sound signal, and the non-ambient-sound signal. In some embodiments, generating the modified set of modification rules may include identifying a modification rule in the set of modification rules associated with the modification to the output of the blended signal, generating an updated modification rule based at least in part on the modification rule and the modification to the output of the blended signal, and replacing, in the set of modification rules, the modification rule with the updated modification rule.

Various embodiments may further provide for non-transitory, computer-readable medium having stored thereon computer-executable software instructions configured to cause a processor of an audio computing device to perform operations that include obtaining an ambient-sound signal, obtaining a non-ambient-sound signal, determining contextual information related to the ambient-sound signal and the non-ambient-sound signal, identifying, from a set of modification rules and based at least in part on the contextual information, a first set of modifications related to the ambient-sound signal, identifying, from the set of modification rules and based at least in part on the contextual information, a second set of modifications related to the non-ambient-sound signal, generating a blended signal using at least the first set of modifications, the second set of modifications, the ambient-sound signal, and the non-ambient-sound signal, causing output of the blended signal, determining that a user input has been received by the audio computing device during output of the blended signal, wherein the user input causes a modification to the output of the blended signal, and generating a modified set of modification rules based at least in part on the modification to the output of the blended signal, the contextual information, and the set of modification rules. In some embodiments, the contextual information may include information regarding at least one of a characteristic of the ambient-sound signal, a characteristic of the non-ambient-sound signal, sensor information obtained from at least one sensor of the audio computing device, operational information regarding an operating state of the audio computing device, or network information regarding a state or condition of a network to which the audio device is connected.

In some embodiments, the computer-executable software instructions may be configured to cause the processor of the audio computing device to perform operations such that obtaining the ambient-sound signal includes obtaining the ambient-sound signal using a microphone of the audio computing device and obtaining the non-ambient-sound signal includes obtaining the non-ambient-sound signal from at least one of an internal memory of the audio computing device or an external computing device. In some embodiments, the computer-executable software instructions may be configured to cause the processor of the audio computing device to perform operations such that identifying the set of modifications also includes providing the contextual information to an external computing device and receiving the set of modifications from the external computing device.

In some embodiments, the computer-executable software instructions may be configured to cause the processor of the audio computing device to perform operations that also include determining updated contextual information based at least in part on the contextual information, identifying, from the modified set of modification rules and based at least in part on the updated contextual information, a third set of modifications related to the ambient-sound signal, identifying, from the modified set of modification rules and based at least in part on the updated contextual information, a fourth set of modifications related to the non-ambient-sound signal, and generating another blended signal using at least the third set of modifications, the fourth set of modifications, the ambient-sound signal, and the non-ambient-sound signal. In some embodiments, the computer-executable software instructions may be configured to cause the processor of the audio computing device to perform operations such that generating the modified set of modification rules includes identifying a modification rule in the set of modification rules associated with the modification to the output of the blended signal, generating an updated modification rule based at least in part on the modification rule and the modification to the output of the blended signal, and replacing, in the set of modification rules, the modification rule with the updated modification rule.

Various embodiments may further provide for an audio computing device that includes a microphone, a memory configured to store processor-executable instructions, and a processor in communication with the memory and the microphone. In some embodiments, the processor may be configured to execute the processor-executable instructions to perform operations that include obtaining an ambient-sound signal, obtaining a non-ambient-sound signal, determining contextual information related to the ambient-sound signal and the non-ambient-sound signal, identifying, from a set of modification rules and based at least in part on the contextual information, a first set of modifications related to the ambient-sound signal, identifying, from the set of modification rules and based at least in part on the contextual information, a second set of modifications related to the non-ambient-sound signal, generating a blended signal using at least the first set of modifications, the second set of modifications, the ambient-sound signal, and the non-ambient-sound signal, causing output of the blended signal, determining that a user input has been received by the audio computing device during output of the blended signal, wherein the user input causes a modification to the output of the blended signal, and generating a modified set of modification rules based at least in part on the modification to the output of the blended signal, the contextual information, and the set of modification rules. In some embodiments, the contextual information may include information regarding at least one of a characteristic of the ambient-sound signal, a characteristic of the non-ambient-sound signal, sensor information obtained from at least one sensor of the audio computing device, operational information regarding an operating state of the audio computing device, or network information regarding a state or condition of a network to which the audio device is connected. In some embodiments, the user input may include a voice command included in the ambient-sound-signal.

In some embodiments, the processor may be configured to execute the processor-executable instructions to perform operations such that obtaining the ambient-sound signal may include obtaining the ambient-sound signal using a microphone of the audio computing device and obtaining the non-ambient-sound signal may include obtaining the non-ambient-sound signal from at least one of an internal memory of the audio computing device or an external computing device. In some embodiments, the processor may be configured to execute the processor-executable instructions to perform operations such that identifying the set of modifications includes providing the contextual information to an external computing device and receiving the set of modifications from the external computing device.

In some embodiments, the processor may be configured to execute the processor-executable instructions to perform operations that also include determining updated contextual information based at least in part on the contextual information, identifying, from the modified set of modification rules and based at least in part on the updated contextual information, a third set of modifications related to the ambient-sound signal, identifying, from the modified set of modification rules and based at least in part on the updated contextual information, a fourth set of modifications related to the non-ambient-sound signal, and generating another blended signal using at least the third set of modifications, the fourth set of modifications, the ambient-sound signal, and the non-ambient-sound signal. In some embodiments, the processor may be configured to execute the processor-executable instructions to perform operations such that generating the modified set of modification rules includes identifying a modification rule in the set of modification rules associated with the modification to the output of the blended signal, generating an updated modification rule based at least in part on the modification rule and the modification to the output of the blended signal, and replacing, in the set of modification rules, the modification rule with the updated modification rule.

In some embodiments, the audio computing device may also include a speaker through which the blended signal is output as sound. In such embodiments, the audio computing device may be configured as a personal audio device that is removably coupleable to an ear of a user to position the speaker in proximity of the user's ear canal.

Various embodiments may further provide for an audio computing device that includes means for performing operations of any of the methods described above. Various embodiments may further provide for a system that includes an attachment apparatus that includes a processor configured to execute processor-executable instructions to perform operations of any of the methods described above.

BRIEF DESCRIPTION OF THE DRAWINGS

The foregoing embodiments and many of the attendant advantages will become more readily appreciated as the same become better understood by reference to the following detailed description, when taken in conjunction with the accompanying drawings, wherein.

DETAILED DESCRIPTION

Figure 1A:
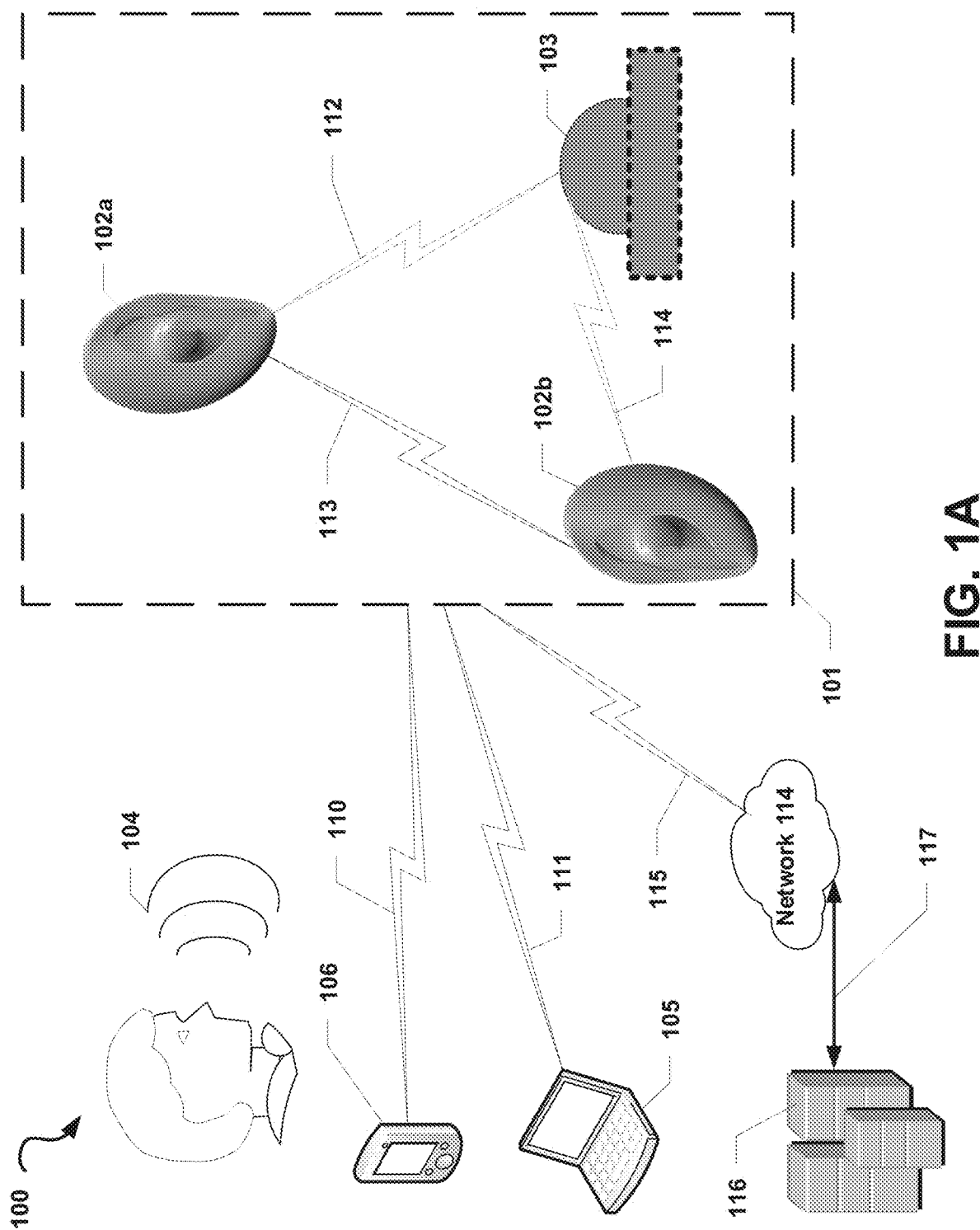
FIG. 1A is a communication system diagram suitable for implementing various embodiments.

In overview, aspects of the present disclosure include audio computing devices that feature improvements over current audio computing devices, such as those described above. Generally described, an audio computing device may obtain one or more ambient sound signals by capturing ambient sounds with a microphone included in or on the audio computing device. The audio computing device may also obtain one or more non-ambient sound signals that do not represent ambient sounds (e.g., sounds not created in the environment in proximity to the user). The audio computing device may determine the content and other characteristics of the ambient-sound signal and the non-ambient-sound signal, as well as other contextual information, such as the current operational state of the audio computing device. The audio computing device may modify one or both of the sound signals to change properties of the sound signals based at least in part on this contextual information. The audio computing device may then combine, mix, or otherwise blend the modified sound signals together into a blended signal having one or more desirable characteristics. The audio computing device may then cause the blended signal to be output as sound via a speaker that provides an improved audio experience for a user of the audio computing device.

As used herein, the terms "audio signal" and "sound signal" are used interchangeably and each refers to an electrical signal that includes or otherwise represents an audio wave as would be understood by one of ordinary skill in the art. Accordingly, an audio signal may be cancelled out or modified, such as by adjusting amplitude, frequency, period, or the like. The term "ambient-sound signal" is used herein to refer to an audio signal that represents ambient sounds captured on a microphone of an audio computing device. By way of a non-limiting example, an ambient-sound signal may represent one or more of human speech, environmental sounds or noise, or the like or any combination thereof. As used herein, the term "non-ambient-sound signal" refers to an audio signal that includes sounds not captured from the user's environment (e.g., non-ambient sounds). Non-ambient-sound signals may include, without limitation, audio signals related to a phone call received on an audio computing device, audio signals generated from music or audio data stored on the audio computing device, audio signals received from another computing device (e.g., via a communication link), or the like. Further, the term "blended signal" refers to an audio signal that is formed from some combination of at least two separate audio signals (including combinations in which a signal is cancelled out and thus not represented in the blended signal or that is omitted from the blended signal). For example, an ambient-sound signal may be mixed with, blended with, added to, subtracted from, or otherwise combined with a non-ambient-sound signal to form a blended audio signal.

In some embodiments, the contextual information may include or otherwise be related to information related to characteristics of the ambient-sound signal and/or the non-ambient-sound signal. These characteristics may include, for each of the ambient-sound signal and the non-ambient-sound signal, a source or a likely source, related acoustic properties (e.g., amplitude, volume, and/or gain), and the like. Additionally (or alternatively), the contextual information may include or be related to sensor information obtained from sensor included on the audio computing device or from external sensors, operational information regarding the operating state or condition of the audio computing device, information regarding a source of the ambient-sound signal and/or a source of the non-ambient-sound signal, network information regarding the networking state of the audio computing device and/or the computing device with which the audio computing device is in communication via a network, and the like or any combination therein.

In some embodiments, the audio computing device may utilize the contextual information, directly or indirectly, to determine a manner and/or an extent to which the ambient-sound signal and/or the non-ambient-sound signal are to be modified prior to blending the ambient-sound signal and the non-ambient-sound signal together. By way of a non-limiting example, the contextual information may indicate that the volume or gain of the ambient-sound signal should be reduced by half in a situation in which the ambient-sound signal represents ambient noise and the non-ambient-sound signal represents audio from a phone call handled (at least in part) on the audio computing device. In this example, the audio computing device may reduce the ambient-sound signal by half in order to allow the user of the audio computing device to clearly hear audio from the phone call represented in the non-ambient-sound signal. In some embodiments, the audio computing device may obtain the contextual information from another computing device via a network or communication link. Alternatively, or additionally, the audio computing device may generate the contextual information without communicating with another computing device.

In some embodiments, the audio computing device may associate contextual information with one or more characteristics of audio, external or internal characteristics of the audio computing device, or the like. The audio computing device may store such contextual information or cause such contextual information to be stored (e.g., in another computing device). The audio computing device may determine whether previously stored contextual information is suitable for use in blending together audio signals based on the characteristics of the audio signals or other external or internal characteristics present in or experienced by the audio computing device. In such embodiments, the audio computing device may obtain previously stored contextual information when such contextual information is suitable for use given the present circumstances in which the audio computing device will blend audio signals.

In some embodiments, the audio computing device may organize the contextual information in a data structure, such as a hash table, an array of values (e.g., a feature vector), a database, or the like. For example, the audio computing device may generate a hash table describing the contextual characteristics related to the sound signals. In such an example, a table data structure may include a field "active phone call" and a value for that field of "true" or "false." The audio computing device may cross reference the data in the contextual information against a set of modification rules or one or more data models that describe a set of modifications (including an empty set) that the audio computing device may make to the ambient-sound signal and/or the non-ambient-sound signal in light of the information included in the contextual information. In the above example, the audio computing device may identify, based on the contextual information and the set of rules, a set of modifications, and the audio computing device may modify the ambient-sound signal based on the set of modification in order to cause the blended signal generated from the ambient-sound signal to feature the sounds of the ambient-sound signal less prominently. Specifically, in this example, while the audio computing device is engaged in an active phone call, the blended signal output from the audio computing device may feature the sounds represented in the ambient sound signal at a reduced volume (e.g., a 50% volume level) in comparison to the volume of the sounds represented in the non-ambient sound signal (e.g., a 100% volume level) to improve the user's ability to participate in the phone call.

In some embodiments, the audio computing device may utilize the contextual information and the set of modification rules to modify one or both of the ambient-sound signal and the non-ambient-sound signal prior to generating the blended audio signal from the ambient-sound signal and the non-ambient-sound signal. For example, the audio computing device may decrease the gain of an ambient-sound signal prior to blending the ambient-sound signal with a non-ambient-sound signal. Thus, accordingly to some embodiments, the audio computing device may achieve a "fading" effect (at least temporarily) of one audio signal in favor another audio signal based on the content of the audio signals and the context in which those audio signals will be played out on the audio computing device.

In some embodiments, the audio computing device may preemptively modify an ambient-sound signal by filtering out portions of the ambient-sound signal that include or that are associated with undesired characteristics. For example, the audio computing device may obtain an ambient-sound signal that represents loud noises (e.g., a car alarm), and the audio computing device may preemptively remove portions of the ambient-sound signal that include these loud noises. In such embodiments, the audio computing device may then modify the filtered ambient-sound signal (if required) and blend the filtered and modified ambient-sound signal with a non-ambient-sound signal to generate a blended signal.

In some embodiments, the audio computing device may determine that an ambient-sound signal represents human speech. In such embodiments, the set of rules may indicate that ambient-sound signals that include human speech have a relatively high priority. Accordingly, the audio computing device may generate a blended signal with the ambient-sound signal to cause the human speech to be represented prominently in the blended signal, such as by amplifying the ambient-sound signal and/or diminishing, cancelling out, or omitting the non-ambient-sound signal prior to blending those signals. For example, the audio computing device may generate a blended signal that, when played out, clearly features human speech.

In some embodiments, the audio computing device may continually monitor the ambient-sound signal (and/or the non-ambient-sound signal) to determine whether the characteristics of either signal (e.g., contextual information related to one or both of the signals) changes and may modify the blended signal in response. For example, during playout of a blended signal, the audio computing device may detect that the ambient-sound signal includes human speech. Accordingly, the audio computing device may generate a subsequent blended signal to feature the ambient-sound signal in the blended signal to a greater extent than the non-ambient-sound signal. In this example, during playout of the subsequent blended signal, the user of the audio computing device may hear or otherwise experience the human speech of the ambient-sound signal at a greater volume than sounds included in the non-ambient-sound signal. In some embodiments, the audio computing device may detect when human speech is no longer represented in the ambient-sound signal and may generate yet another blended signal to reflect that change, such as by causing the ambient-sound signal to be represented in that blended signal to a lesser degree.

In some embodiments, the audio computing device may determine whether human speech included in the ambient-sound signal is directed at the audio computing device, such as by measuring the relative volume or power of the human speech received on the microphone of the audio computing device. In such embodiments, the audio computing device may generate (or modify) a blended signal such that ambient-sound signals that include human speech directed at the audio computing device are featured prominently, whereas an ambient-sound signal that include human speech that is not directed at the audio computing device (e.g., background chatter) may be featured less prominently in the blended signal.

In some embodiments, the audio computing device may generate a blended signal from an ambient-sound signal and a non-ambient-sound signal such that one of the ambient-sound signal or the non-ambient-sound signal is excluded from the blended signal. In such embodiments, the audio computing device may discard the excluded audio signal or may suspend playout of such audio signal. For example, while the audio computing device is handling an active phone call, an ambient-sound signal of ambient sounds may not be included with a non-ambient-sound signal of the phone call in a blended signal that is played out to the user. In another example, while the audio computing device is detecting directed human speech in an ambient-sound signal, the audio computing device may suspend inclusion of a non-ambient-sound signal representative of a song in the blended signal and may resume inclusion of the non-ambient-sound signal in response to determining that the ambient-sound signal no longer includes directed human speech. In such an example, the audio computing device may pause playout of a song while someone is speaking directly at the audio computing device or while the user is speaking and may resume playout of the song when no one is speaking directly at the audio computing device or when the user stops speaking.

In some embodiments, the audio computing device may preemptively modify the ambient-sound signal to enable a user of the audio computing device to hear human speech from one or more other individuals. Specifically, the audio computing device may determine that the ambient-sound signal includes human speech directed at the audio computing device. In response, the audio computing device may remove or filter out portions of the ambient-sound signal that do not relate the directed human speech. In such embodiments, the audio computing device may generate a blended signal that features the directed human speech of the ambient-sound signal exclusively or to a relatively greater degree to the degree in which the non-ambient-sound signal is featured in the blended signal. In a non-limiting example, the audio computing device may perform the above operations to enable a user of the audio computing device to hear only (or to a significantly greater degree) directed human speech while other sounds are eliminated or muted.

In some embodiments, the audio computing device may enable or facilitate two-way conversations between a user of the audio computing device and a user of another audio computing device. For example, the audio computing device may establish a communication link with the other audio computing device. The audio computing device may receive a non-ambient-sound signal from the other computing device, and the non-ambient-sound signal may include human speech from the user of the other audio computing device. The audio computing device may generate a blended signal that features only the non-ambient-sound signal or that features the non-ambient-sound signal to a greater degree than the extent to which the ambient-sound signal is featured in the blended signal. By way of an example, the audio computing device may receive human speech from the other computing device and may output only that human speech.

In some embodiments, the audio computing device may generate a blended signal from an ambient-sound signal and a non-ambient-sound signal based at least in part on keywords or phrases that the audio computing device detects in the ambient-sound signal. Specifically, the audio computing device may detect a command, statement, or other speech input in the ambient-sound signal and may generate the blended signal accordingly. For example, the audio computing device may determine that the ambient-sound signal includes a representation of the phrase "going for a run." In response, the audio computing device may generate the blended signal from the first and non-ambient-sound signal such that the ambient-sound signal and the non-ambient-sound signal are represented approximately equally in the blended signal (e.g., a 50% "fade" between each signal). In another example, the audio computing device may determine that the ambient-sound signal represents the phrase "quiet time," and the audio computing device may blend the first and non-ambient-sound signals such that the ambient-sound signal that includes ambient noise is eliminated from the blended signal.

In some embodiments, the audio computing device may determine the content of an audio signal by comparing the audio signal to one or more audio profiles. For example, the audio computing device may determine that an ambient-sound signal includes human speech by comparing at least a portion of the ambient-sound signal to a human speech audio profile. These one or more audio profiles may be stored on the audio computing device. Additionally (or alternatively), one or more audio profiles may be stored on a remote computing device. In such embodiments, the audio computing device may send at least a portion of an audio signal to the remote computing device, and the remote computing device may provide the audio computing device with information related to the content of the audio signal.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

FIG. 1A is a block diagram depicting an illustrative operating environment 100 suitable for implementing aspects of the present disclosure, according to some embodiments. In the example illustrated in FIG. 1A, an audio system 101 may include a first audio computing device 102a and a second audio computing device 102b. In some optional embodiments, the audio system 101 may also include a base device 103. In a non-limiting example, the audio computing devices 102a or 102b may be a personal computing device, laptop computing device, hand held computing device, terminal computing device, mobile device (e.g., mobile phones or tablet computing devices), wearable device configured with network access and program execution capabilities (e.g., "smart eyewear," "smart watches," "smart earphones," or "smart headphones"), wireless device, electronic reader, media player, home entertainment system, gaming console, set-top box, television configured with network access and program execution capabilities (e.g., "smart TVs"), or some other electronic device or appliance.

The first audio computing device 102a and the second audio computing device 102b may communicate with each other via a wireless communication link 113, such as a Wi-Fi Direct, Bluetooth®, or similar communication link. In some embodiments, the first audio computing device 102a and the second audio computing device 102b may maintain a master-slave relationship in which one of the first audio computing device 102a or the second audio computing device 102b (the "master" device) coordinates activities, operations, and/or functions between the audio computing devices 102a, 102b via the wireless communication link 113. The other audio computing device of the first audio computing device 102a or the second audio computing device 102b (the "slave" device) may receive commands from and may provide information or confirmations to the master device via the communication link 113. By way of a non-limiting example, the first audio computing device 102a may be the master device and may provide audio data and timing/synchronization information to the second audio computing device 102b to enable the second audio computing device 102b to begin output of the audio data in sync with output of the audio data by the first audio computing device 102a. In this example, the first audio computing device 102a may provide a data representation of a song and timing information to the second audio computing device 102b to enable the second audio computing device 102a and the first audio computing device 102a to play the song at the same time via one or more of their respective speakers. Alternatively, the first audio computing device 102a and the second audio computing device 102b may be peer devices in which each of the devices 102a, 102b shares information, sensor readings, data, and the like and coordinates activities, operations, functions, or the like between the devices 102a, 102b without one device directly controlling the operations of the other device.

The first audio computing device 102a and/or the second audio computing device 102b may be in communication with the base device 103, for example, via wireless communication links 112, 114. In some embodiments, the base device 103 may provide information or other data (e.g., audio data) to each of the first audio computing device 102a and the second audio computing device 102b. By way of a non-limiting example, the base device 103 may provide audio data and/or timing data to the first audio computing device 102a and the second audio computing device 102b to enable the devices 102a, 102b to play out the audio data at the same or nearly the same time. In some embodiments, the base device 103 may be in communication with only one of the first audio computing device 102a and the second audio computing device 102b (e.g., the "master" device, as described), and information or data provided from the base device 103 to the master device may be shared with the other one of the first audio computing device 102a and the second audio computing device 102b (e.g., the "slave" device, as described).

In some embodiments, at least one device of the audio system 101 (e.g., one of the first audio computing device 102a, the second audio computing device 102b, or the base device 103) may be in communication with one or more computing devices external to the audio system 101 and may send and receive information and other data to and from these external computing devices. In the non-limiting example illustrated in FIG. 1, at least one device of the audio system 101 may be in communication with a mobile computing device 106 via a wireless communication link 110 and/or another computing device 105 via a wireless communication link 111. For example, the first audio computing device 102a and the second audio computing device 102b may each establish a Bluetooth® the wireless communication link 110 with the mobile computing device 106 (e.g., a smartphone) and may stream audio provided from the mobile computing device 106 according to one or more known streaming protocols. Those skilled in the art will recognize that the computing devices 105 and 106 may be any of a number of computing devices capable of communicating via a wireless or wired link including, but not limited to, a laptop, personal computer, personal digital assistant (PDA), hybrid PDA/mobile phone, mobile phone, smartphone, wearable computing device (e.g., wireless headphones or earphones), electronic book reader, digital media player, tablet computer, gaming console or controller, kiosk, augmented or virtual reality device, other wireless device, set-top or other television box, or the like.

Additionally (or alternatively), at least one device of the audio system 101 may be in direct or indirect communication with one or more network computing devices 116 via at least one network 114. For example, at least one of the devices in the audio system 101 may establish a wireless communication link (e.g., a Wi-Fi link, a cellular LTE link, or the like) to a wireless access point, a cellular base station, and/or another intermediary device that may be directly or indirectly in communication with the one or more network computing devices 116 via a communication link 117. In such embodiments, at least one of the devices in the audio system 101 may communicate indirectly with the one or more network computing devices 116 via one or more intermediary devices. In another example, the first audio computing device 102a and/or the second audio computing device 102b may send, via the network 114, a request to receive a stream of audio data from the one or more network computing devices 116, and the one or more network computing devices 116 may respond to the request by providing the first audio computing device 102a and/or the second audio computing device 102b with the requested stream of data. In some embodiments, at least one device of the audio system 101 may include a microphone configured to receive an analog source of sound 104 (e.g., a human).

Each of the communication links 110, 111, 112, 113, 114, 115, 117 described herein may be communication paths through networks (not shown), which may include wired networks, wireless networks or combination thereof (e.g., the network 114). In addition, such networks may be personal area networks, local area networks, wide area networks, cable networks, satellite networks, cellular telephone networks, etc. or combination thereof. In addition, the networks may be a personal area network, local area network, wide area network, over-the-air broadcast network (e.g., for radio or television), cable network, satellite network, cellular telephone network, or combination thereof. In some embodiments, the networks may be private or semi-private networks, such as a corporate or university intranets. The networks may also include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art and, thus, are not described in more detail herein.

For ease of description, the audio system is illustrated in FIG. 1A as being in communication with the devices 105, 106 and the one or more network computing devices 116, the audio system 101. However, in some embodiments, the audio system 101 may be in communication with more or fewer communication computing devices and/or network computing devices than those illustrated in FIG. 1A.

It will be recognized that many of the devices described above are optional and that embodiments of the environment 100 may or may not combine devices. Furthermore, devices need not be distinct or discrete. Devices may also be reorganized in the environment 100. For example, the network computing device 116 may be represented in a single physical server or, alternatively, may be split into multiple physical servers. Additionally, the environment 100 may not include a network 114.

Figure 1B:
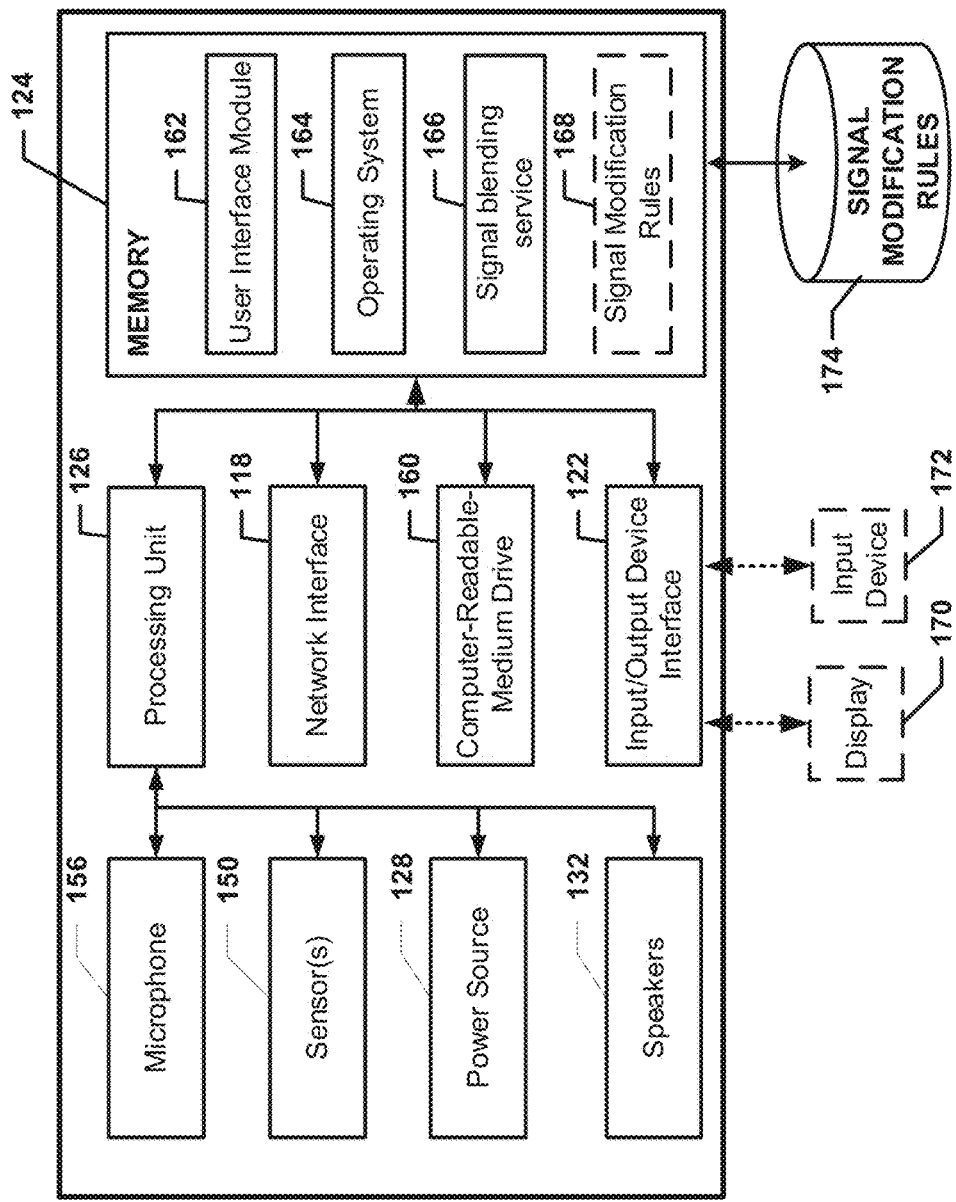
FIG. 1B is a component block diagram illustrating an audio computing device included in the audio computing device illustrated in FIG. 1A, according to some embodiments.

FIG. 1B depicts a general architecture of the audio computing device 102a, which includes an arrangement of computer hardware and software components that may be used to implement aspects of the present disclosure, according to some embodiments. The audio computing device 102a may include many more (or fewer) elements than those shown in FIG. 1B. It is not necessary, however, that all of these generally conventional elements be shown in order to provide an enabling disclosure.

As illustrated, the first audio computing device 102a may include an input/output device interface 122, a network interface 118, a microphone 156, a computer-readable-medium drive 160, a memory 124, a processing unit 126, a power source 128, an optional display 170, and at least one speaker 132, all of which may communicate with one another by way of a communication bus. The network interface 118 may provide connectivity to one or more networks or computing systems, and the processing unit 126 may receive and/or send information and instructions from/to other computing systems or services via the network interface 118. For example (as illustrated in FIG. 1A), the network interface 118 may be configured to communicate with the second audio computing device 102b, the base device 103, the mobile computing device 106, and/or the other computing device 105 via wireless communication links, such as via a Wi-Fi Direct or Bluetooth communication links. The network interface 118 may also (or alternatively) be configured to communicate with one or more computing devices via a wired communication link (not shown).

The processing unit 126 may communicate to and from memory 124 and may provide output information for the optional display 170 via the input/output device interface 122. In some embodiments, the memory 124 may include RAM, ROM, and/or other persistent, auxiliary or non-transitory computer-readable media. The memory 124 may store an operating system 164 that provides computer program instructions for use by the processing unit 126 in the general administration and operation of the first audio computing device 102a. The memory 124 may include a user interface module 164 that provides computer program instructions for use by the processing unit 126 and/or the input/output device interface 122 in receiving and processing user inputs (e.g., touch inputs on a touchpad or button inputs).

The memory 124 may further include computer program instructions and other information for implementing aspects of the present disclosure. For example, in some embodiments, the memory 124 may include a signal blending service 166, which may be executed by the processing unit 126 to implement various aspects of the present disclosure. In some embodiments, the signal blending service 166 may obtain an ambient sound signal and a non-ambient sound signal. For example, the signal blending service 166 may obtain an ambient sound signal, directly or indirectly, from the microphone 156, and the signal blending service 166 may receive a non-ambient sound signal, directly or indirectly, from the network interface 118 or the computer-readable-medium drive 160. In some embodiments (not shown), the memory 124 may contain digital representations of audio data or electronic audio signals (e.g., digital copies of songs or videos with audio). In such embodiments, the signal blending service 166 may obtain the audio data or electronic audio signals from the memory 124. In some embodiments, the network interface 118 may receive audio data from one or more other computing devices and may provide the audio data to the signal blending service 166. In such embodiments, the signal blending service 166 may cause the audio data to be transformed into a non-ambient sound signal.

In some embodiments, the signal blending service 166 may determine contextual information related to an ambient sound signal and a non-ambient sound signal (e.g., as described above) and may identify a set of rules related to the contextual information. In some embodiments, the signal blending service 166 may obtain the set of rules by performing a look-up operation in signal modification rules 168 stored in the memory 124 to identify a set of modification rules associated with the contextual information related to the ambient sound signal and/or the non-ambient sound signal. In some embodiments, the signal modification rules 166 may perform a similar look-up operation in an external database of signal modification rules (e.g., in database 174) to determine a set of modification rules related to the contextual information, the ambient sound signal, and/or the non-ambient-sound signal. The signal blending service 166 may utilize the set of modification rules to determine a set of modifications parameters to utilize when modifying the ambient-sound signal and/or the non-ambient sound signal. The signal blending service 166 may then modify each of the ambient-sound signal and the non-ambient sound signal (if necessary) based on their respective sets of modification parameters. The signal blending service 166 may then blend the signals together into a blended signal and may cause the blended signal to be output (e.g., via the speaker 132). While the signal blending service 166 is illustrated as a distinct module in the memory 124, in some embodiments, the signal blending service 166 may be incorporated as a module in the operating system 164 or another application or module, and as such, a separate signal blending service 166 may not be required to implement some embodiments.

In some embodiments, the input/output interface 122 may also receive input from an input device 172, such as a keyboard, mouse, digital pen, microphone, touch screen, gesture recognition system, voice recognition system, image recognition through an imaging device (which may capture eye, hand, head, body tracking data and/or placement), gamepad, accelerometer, gyroscope, or another input device known in the art. In some embodiments, the microphone 156 may be configured to receive sound from an analog sound source (e.g., the analog sound source 104 described with reference to FIG. 1A). For example, the microphone 156 may be configured to receive human speech. The microphone 156 may further be configured to convert the sound into audio data or electrical audio signals that are directly or indirectly provided to the signal blending service 166.

In some embodiments, the first audio computing device 102a may include one or more sensors 150. The one or more sensors 150 may include, but are not limited to, one or more biometric sensors, heat sensors, chronological/timing sensors, geolocation sensors, gyroscopic sensors, accelerometers, pressure sensors, force sensors, light sensors, or the like. In such embodiment, the one or more sensors 150 may be configured to obtain sensor information from a user of the first audio computing device 102a and/or from an environment in which the first audio computing device 102a is utilized by the user. The processing unit 126 may receive sensor readings from the one or more sensors 150 and may generate one or more outputs based on these sensor readings. For example, the processing unit 126 may configure a light-emitting diode included on the audio system (not shown) to flash according to a preconfigured patterned based on the sensor readings.

In some embodiments, the second audio computing device 102b may be configured similarly to the first audio computing device 102a and, as such, may be configured to include components similar to or the same as one or more of the structural or functional components described above with reference to the first audio computing device 102a. In some additional (or alternative) embodiments, the base device 103 may also be generally configured to include the same or similar components the first audio computing device 102a as described with reference to FIG. 1B.

Figure 2:
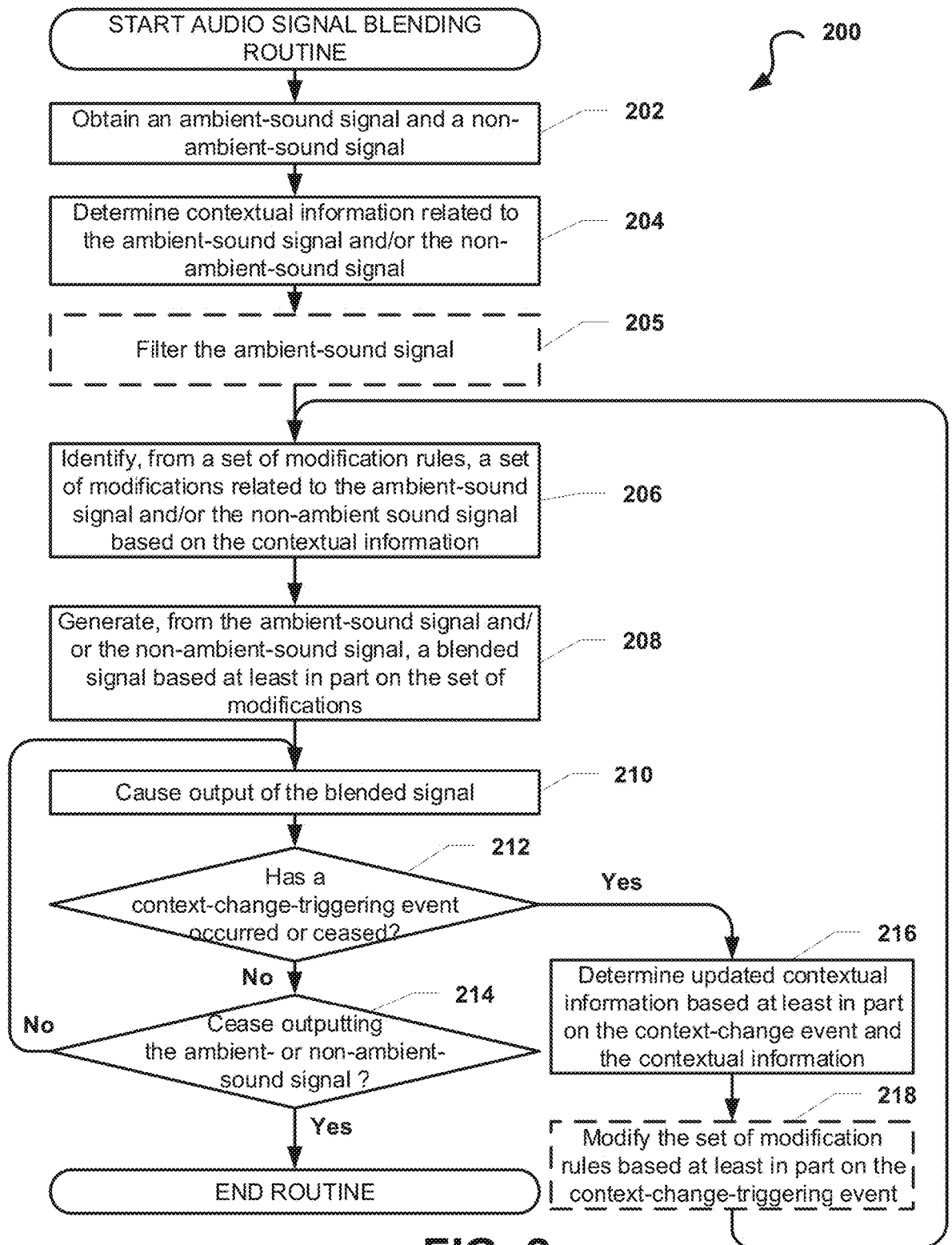
FIG. 2 is a process flow diagram illustrating an embodiment computer-implemented method for dynamically blending audio signals, according to some embodiments.

FIG. 2 is a flow diagram depicting an illustrative computer-implement method or routine 200 for blending audio signals, according to some embodiments. In some embodiments, the routine 200 may be implemented by a signal blending service operating on an audio computing device (e.g., the signal blending service 166 of the audio computing device 102a as described with reference to FIG. 1B). In block 202, the signal blending service 166 may obtain an ambient-sound signal and a non-ambient-sound signal. In some embodiments of the operations performed in block 202, the signal blending service 166 may obtain the ambient-sound signal and the non-ambient-sound signal nearly simultaneously. Alternatively, the signal blending service 166 may obtain the ambient-sound signal and the non-ambient-sound at different times.

The ambient-sound signal may include or otherwise represents ambient sound that is captured via a microphone on the audio computing device 102a (e.g., the microphone 156 as described with reference to FIG. 1B). For example, the microphone 156 may capture one or more of human speech, traffic noise, environmental sounds, or various other sounds or combination of sounds. In this example, the microphone 156 may convert the sound captured on the microphone 156 into an ambient sound signal, and the microphone 156 may provide the ambient sound signal, directly or indirectly, to the signal blending service 166.

In some embodiments of the operations performed in block 202, the signal blending service 166 may obtain a non-ambient-sound signal that does not represent ambient sound. The non-ambient-sound signal may originate from one or more sources distinct from the one or more sources of the ambient sound signal. In some embodiments, the one or more sources of the non-ambient-sound signal may include, without limitation, computing devices in communication with the audio computing device 102a and/or sources internal to the audio computing device 102a (e.g., the memory 126 as described with reference to FIG. 1B). Specifically, according to some embodiments, the signal blending service 166 may receive the non-ambient-sound signal from another computing device via a wired or wireless communication link. In some examples, the signal blending service 166 may receive the non-ambient-sound signal, directly or indirectly, from the second audio computing device 102b and/or the base device 103, the one or more network computing devices 116, from the computing devices 105, 106, or other computing devices or combinations of computing devices (e.g., via one or more communication or network links described with reference to FIG. 1A). In some alternative (or additional) embodiments, the signal blending service 166 may obtain some or all of the non-ambient-sound signal from one or more sources that are internal to the audio computing device 102a. In such embodiments, a processing unit of the audio computing device 102a (e.g., the processing unit 126 or another processing component) may generate non-ambient-sound signals from audio data stored in the memory 124 and may provide such non-ambient-sound signals to the signal blending service 166. For example, a song from the memory 124 may be converted into a non-ambient-sound signal that may be suitable for playout as sound via the speaker 132, and this non-ambient-sound signal may be provided, directly or indirectly, to the signal blending service 166. The signal blending service 166 may additionally (or alternatively) obtain the non-ambient-sound signal from one or more other sources that may be apparent to one of ordinary skill in the art.

In block 204, the signal blending service 166 may determine contextual information related at least to one of the ambient-sound signal or the non-ambient-sound signal. As further described (e.g., with reference to FIG. 3), the contextual information may relate to one or more of the characteristics of the first and/or non-ambient-sound signals (e.g., their respective signal strengths, amplitudes, gains, frequencies, or the like), one or more sensor measurements—taken by the audio computing device 102a (e.g., via the sensors 150) or received from another computing device—, operational information of the audio computing device 102a at or about the time the ambient sound signal and/or the non-ambient-sound signals are obtained, historical operational information of the audio computing device 102a, historical information regarding user inputs or user-specified settings, information regarding the nature or characteristics of the sources of the ambient and non-ambient sound signals, network conditions currently or previously experienced by the audio computing device 102a (e.g., network conditions at or about the time the audio signals are received and/or processed), and other information or combinations of information. In some embodiments, the contextual information may depict various conditions, states, characteristics, or other features related to obtaining the ambient and/or non-ambient-sound signals or the processing and output as sound of the same.

In optional block 205, the signal blending service 166 may optionally filter the ambient-sound signal to remove undesired characteristics from the ambient-sound signal. For example, the signal blending service 166 may filter out unwanted noise from the ambient-sound signal, such as traffic or other environmental noise. In some embodiments, the signal blending service 166 may compare characteristics of one or more portions of the ambient sound signal with one or more sound profiles or sounds models to identify one or more portions of the ambient-sound signal that may include unwanted characteristics. These sound profiles or sound models may be stored locally on the audio computing device 102a and/or may be stored on an external computing device accessible via a communication or network link. Filtering the ambient-sound signal is further described herein (e.g., with reference to FIG. 5).

In block 206, the signal blending service 166 may identify, from a set of modification rules, a set of modifications related to the ambient-sound signal and/or the non-ambient sound signal based at least in part on the contextual information determined in block 204. In some embodiments, the set of modification rules may reflect relative priorities between the ambient-sound signal and the non-ambient-sound signal (or aspects of the same) in light of the context in which those sound signals are expected to be played out as sound. In such embodiments, the set of modification rules may also (or alternatively) indicate one or more modifications that may be applied to the ambient-sound signal and/or the non-ambient-sound signal based on the contextual information related to those sound signals.

The set of modification rules may be organized as a table, dataset, data structure, or the like. The signal blending service 166 may access the set of modification rules from local memory on the audio computing device 102 (e.g., from the memory 124) or from external memory (e.g., from the datastore 174). In some embodiments, the set of rules may be organized as a data model, and the signal blending service 166 may apply the contextual information to the data model including one or more decision trees to determine how and to what extent (if any) to modify the ambient-sound signal and/or the non-ambient sound signal prior to blending those sound signals together in light of the contextual information associated with those sound signals.

In some embodiments, the signal blending service 166 may perform a look-up operation in or a cross-reference operation against the set of modification rules using the contextual information determined in block 204. As a result of such operations, the signal blending service 166 may identify a set of one or more modifications related to the ambient-sound signal and/or the non-ambient sound signal. By way of a non-limiting example, the contextual information determined in block 204 may indicate that the non-ambient sound signal is related to an active phone call that is taking place on the audio computing device 102a and that the ambient-sound signal includes only background noise. The signal blending service 166 may perform a look-up operation in the set of modification rules using the contextual information to identify a particular set of modifications related to the contextual information. In the above example, the set of modifications may indicate that the non-ambient sound signal should be amplified by a certain amount (e.g., a 25% increase of expected volume when played out as sound) and that the ambient sound signal should be diminished by another amount (e.g., a 50% decrease in expected volume when played out as sound). Thus, when these sound signals are blended and played out as sound, the user may experience sounds associated with the non-ambient sound signal more than sound associated with the ambient-sound signal.

In block 208, the signal blending service 166 may generate, from at least one of the ambient-sound signal or the non-ambient-sound signal, a blended signal based at least in part on the set of modifications identified in block 206. As described with reference to block 206, the signal blending service 166 may utilize the set of modifications to determine how and/or the extent to which each of the ambient-sound signal and the non-ambient-sound signal will be represented in the blended signal. In some embodiments of the operations performed in block 208, the signal blending service 166 may utilize the set of modifications identified in block 206 to generate a blended signal that represents or reflects the relative importance of the ambient-sound signal in relation to the non-ambient-sound signal. In an example, the signal blending service 166 may determine contextual information in block 204 that indicates that the ambient-sound signal represents human speech and that the non-ambient-sound signal represents music. In this example, the signal blending service 166 may, using the contextual information, perform a look-up operation in a set of modification rules that indicates that that human speech has a higher priority than music. As a result, the signal blending service 166 may identify a set of modifications in block 206 that indicate that the non-ambient-sound signal should be diminished and/or that the ambient-sound signal should be amplified. Thus, in block 208, the signal blending service 166 may generate a blended signal that includes an amplified ambient-sound signal and/or a diminished non-ambient-sound signal.

In some embodiments, the set of modification rules may also (or alternatively) indicate other operations that the signal blending service 166 may perform based on the contextual information determined in block 204. For example, in the above example, the set of modification rules may indicate that the signal blending service 166 should pause playout of the non-ambient-sound signal (e.g., pause playout of music) when the ambient-sound signal includes human speech or human speech directed at the audio computing device 102a. In such example, the signal blending service 166 may generate a blended signal that does not include the non-ambient-sound signal.

In block 210, the signal blending service 166 may cause output of the blended signal. In some embodiments, the signal blending service 166 may provide the blended signal to a speaker included in the signal blending service 166 (or, additionally or alternatively, to an external speaker) for playout as sound. When the blended signal is played out as sound, the sound may reflect the modifications the signal blending service 166 applied to the ambient and/or the non-ambient sound signals in block 208. For example, the user may clearly hear sound related to the active phone call while sound related to the ambient noise may be reduced or muted. In another example, the user may experience ambient sounds at an amplified level.

In determination block 212, the signal blending service 166 may determine whether a context-change-triggering event has occurred or has ceased. Generally described, a context-change-triggering event may occur whenever the contextual information related to the ambient-sound signal and/or the non-ambient-sound signal changes (at least non-trivially). For example, a context-change-triggering event may occur when one of the sources of the ambient-sound signal changes, when an operational state of the signal blending service 166 changes (e.g., when a user ends or initiates a phone call), or the like. In some embodiments, a context-change-triggering event may occur when the signal blending service 166 detects that a user input has been received on the audio computing device 102a and that the user input has caused output of the blended signal to change. For example, the signal blending service 166 may receive a user input that changes the relative priority of the ambient-sound signal (e.g., by increasing a priority value or weight associated with the ambient-sound signal or by decreasing a priority value or weight associated with the non-ambient-sound signal).

In response to determining that a context-change-triggering event has occurred (i.e., determination block 212="YES"), the signal blending service 166 may, in block 216, determine updated contextual information based at least in part on the context-change-triggering event and the contextual information obtained in block 206. In some embodiments, the updated contextual information may reflect updated circumstances, conditions, audio signal sources, or the like related to the ambient-sound signal, the non-ambient-sound signal, and/or the audio computing device 102a. The signal blending service 166 may then repeat the above operations in a loop starting in block 206 by identifying, from the set of modification rules, another set of modifications related to the ambient-sound signal and/or the non-ambient-sound signal based at least in part on the updated contextual information determined in block 216.

By way of a non-limiting example, the signal blending service 166 may determine that a context-change-triggering event has occurred and corresponds with receiving sound from an emergency vehicle as part of the ambient-sound signal. The set of modification rules may reflect that the priority of the emergency vehicle noise has a high priority, and the signal blending service 166 may, in block 206, utilize the updated contextual information to identify another set of modification that indicates that the ambient-sound signal should be amplified. Accordingly, in block 208, the signal blending service 166 may utilize the other set of modifications to generate another blended signal that features or represents the ambient-sound signal (or at least the emergency vehicle sounds) to a greater degree and, optionally, features or represents the non-ambient-sound signal to a lesser degree.

In optional block 218, the signal blending service 166 may modify the set of modification rules based at least in part on the context-change-triggering event determined to have occurred (or ceased) in block 212. In some embodiments, the context-change-triggering event may correspond to a user input that is received on the audio computing device 102a. This user input may override or otherwise modify the output of the blended signal. In such embodiments, the signal blending service 166 may modify the set of modification rules to reflect the results of the user input. By way of a non-limiting example, the set of modification rules may indicate that the gain of a non-ambient-sound signal should be reduced when blending the non-ambient-sound signal with an ambient-sound signal that includes human speech. In this example, the signal blending service 166 may determine that a user input has been received on the audio computing device 102a pausing playback of the non-ambient-sound signal while the ambient-sound signal includes human speech. In response to the user's input, the signal blending service 166 may modify the set of modification rules to reflect that a non-ambient-sound signal should be excluded (at least temporarily) from a blended signal in the event that the ambient-sound signal includes human speech. Thus, in such embodiments, the signal blending service 166 may continually and automatically adapt the set of modification rules to fit a user's preferences without requiring the user to manually change the set of modification rules. The signal blending service 166 may repeat the above operations by, in block 206, identifying, from the modified set of modification rules, a set of modifications based at least in part on the updated contextual information determined in block 216.

In some embodiments of the operations performed in determination block 212, the signal blending service 166 may determine that a previous context-change-triggering event has ceased or has otherwise become inactive. Specifically, in some embodiments, the signal blending service 166 may associate some or all context-change-triggering events with a period during which the context-change-triggering event may be considered to be active. In some embodiments, a context-change-triggering event may be active as long as the context-change-triggering event continues. For example, a context-change-triggering event related to the introduction of a sound from an emergency vehicle into the ambient-sound signal may be active so long as the signal blending service 166 continues detecting the sound from the emergency vehicle in the ambient-sound signal. In such embodiments, the context-change-triggering event may terminate or become inactive once the circumstances of the context-change-triggering event have ended. In the above example, the context-change-triggering event related to the emergency vehicle may end once the signal blending service 166 determines that the sound from the emergency vehicle is no longer represented in the ambient-sound signal. In such embodiments, in response to determining that a context-change-triggering event has ceased (e.g., determination block 212="YES"), the signal blending service 166 may determine updated contextual information in block 216, which, in some instances, may be the same or similar to contextual information determined prior to the occurrence of the context-change-triggering event.

In some embodiments, the signal blending service 166 may utilize updated contextual information generated in response to the detection of an occurrence of the context-change-triggering event for a predetermined period of time. The predetermined period of time may be a relative or absolute period of time. For example, the signal blending service 166 may determine that a context-change-triggering event corresponding with the introduction of a human voice into the ambient-sound signal has occurred. In this example, the signal blending service 166 may determine that this context-change-triggering event persists for five seconds. As such, the signal blending service 166 may generate updated contextual information that may indicate that ambient-sound signal has a relatively higher priority due to the presence of human voice in the ambient-sound signal. The signal blending service 166 may continue utilizing the updated contextual information until the predetermined period of time has elapsed (e.g., after five seconds), at which time the signal blending service 166 may revert to previously generated contextual information (or may generate newly updated contextual information similar to or the same as previously generated contextual information). In some embodiments, the signal blending service 166 may continually reset the predetermined period of time so long as the context-change-triggering event is ongoing. In such embodiments, the signal blending service 166 may continue utilizing the updated contextual information while the context-change-triggering event is ongoing and, additionally, for the predetermined period of time. In the above example, the signal blending service 166 may utilize updated contextual information indicating that the ambient-sound signal has a relatively higher priority so long as the signal blending service 166 detects human speech in the ambient-sound signal and for up to five seconds after determining that human speech is no longer represented in the ambient-sound signal. In some embodiments, the signal blending service 166 may utilize the predetermined period of time to regulate how frequently the contextual information may be updated and, thus, how frequently the blended signal is changed.

In response to determining that a context-change-triggering event has not occurred and has not ceased (i.e., determination block 212="NO"), the signal blending service 166 may determine whether to cease outputting the ambient- or non-ambient-sound signal, in determination block 214. For example, the signal blending service 166 may determine that the non-ambient-sound signal generated from a song stored on the signal blending service 166 has completed playing out via a speaker on the signal blending service 166. In some embodiments, the signal blending service 166 may determine that the ambient- or non-ambient-sound signal has completed output by determining that a user input has caused the ambient- or non-ambient-sound signal to terminate.

In response to determining not to cease outputting the ambient-sound signal or the non-ambient-sound signal (i.e., determination block 214="NO"), the signal blending service 166 may repeat the above operations in a loop by continuing to cause output of the blended signal, in block 210. In response to determining to cease outputting either the ambient-sound signal or the non-ambient-sound signal (i.e., determination block 214="YES"), the signal blending service 166 may cease performing operations of the routine 200.

In some embodiments (e.g., as described above), the signal blending service 166 may obtain the entirety of the ambient-sound signal and the non-ambient-sound signal. In some alternative embodiments, the signal blending service 166 may continually receive portions of the ambient-sound signal and/or the non-ambient-sound signal. For example, the audio computing device 102a may be streaming one or both of the ambient-sound signal and/or the non-ambient-sound signal, and as a result, the signal blending service 166 may receive portions of the same signal over time. In such embodiments, the signal blending service 166 may perform one or more of the operations in the routine 200 for each portion of the sound signals as it is received. In the above example, the signal blending service 166 may repeatedly perform the above operations of the routine 200 while streaming one or both of the ambient-sound signal and/or the non-ambient-sound signal.

Figure 3:
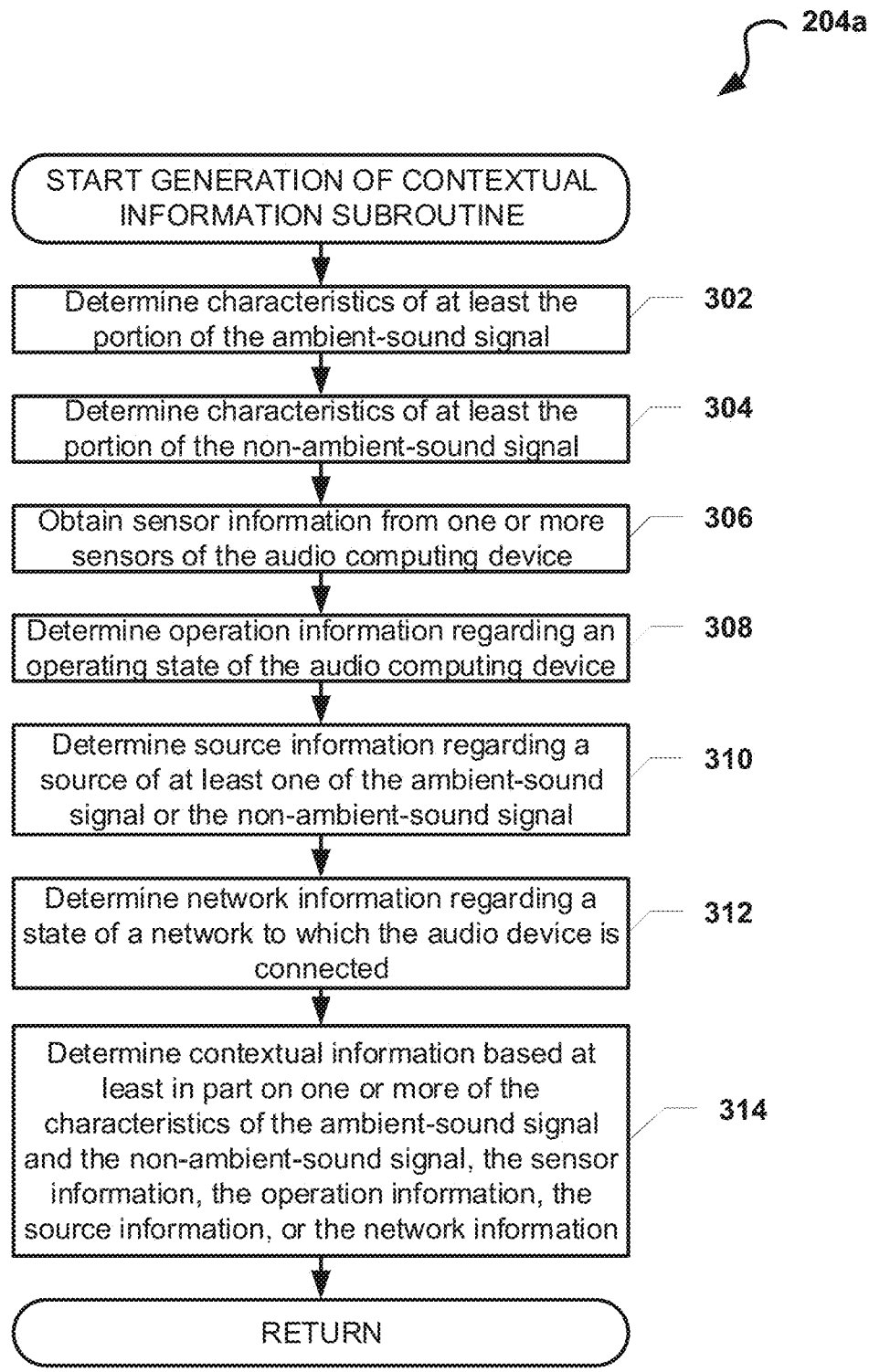
FIG. 3 is a process flow diagram illustrating an embodiment computer-implemented method for dynamically determining audio output information for use in blending audio signals, according to some embodiments.

FIG. 3 is a flow diagram of an illustrative subroutine 204a for obtaining contextual information related to an ambient-sound signal and/or a non-ambient-sound signal, according to some embodiments. In some embodiments, the subroutine 204a may be implemented by a signal blending service operating on an audio computing device (e.g., the signal blending service 166 of the audio computing device 102a as described with reference to FIG. 1B). In some embodiments, the operations of the subroutine 204a implement embodiments of the operations described with reference to block 204 in the subroutine 200. Thus, in such embodiments, the signal blending service 166 may begin performing the subroutine 204a in response to obtaining the ambient-sound signal and the non-ambient-sound signal in block 202 of the routine 200.

In block 302, the signal blending service 166 may determine characteristics of at least the portion of the ambient-sound signal. The signal blending service 166 may also determine characteristics of at least the portion of the non-ambient-sound signal, in block 304. In some embodiments, the characteristics of the ambient-sound signal and/or the non-ambient-sound signal may include one or more physical or electrical properties of the sound signals. In some embodiments, the characteristics may also (or alternatively) relate to the content of the sounds signals, such as words or phrases included in human speech represented in the ambient-sound-signal and/or the non-ambient-sound-signal.

In block 306, the signal blending service 166 may obtain sensor information from one or more sensors. The sensor information may include, without limitation, information about the geolocation of the audio computing device 102a, the current time of date or date, movement information of the audio computing device 102a, and the like. For example, information indicating that the audio computing device is moving may increase the importance of featuring ambient sound in a blended signal in order to increase a user's situational awareness while the user is traveling. In block 308, the signal blending service 166 may determine operational information regarding an operating state of the audio device. In some embodiments, the operational information may include, without limitation, information regarding the processes, operations, applications, programs, or the like that are executing on the audio computing device 102a. For example, the operational information may indicate whether the audio computing device 102a is currently engaged in a phone call, playing out music, browsing the Internet, or another operation or combination of operations. The signal blending service 166 may determine source information regarding a source of at least one of the ambient-sound signal or the second audios signal, in block 310. For example, the signal blending service 166 may determine that the user of the audio computing device 102a is speaking by determining that the user's speech is represented in the ambient-sound signal. In block 312, the signal blending service 166 may determine network information regarding a state of a network or a communication link to which the audio device is connected. For example, a poor network connection may make it more likely that a non-ambient-sound signal may be of poor quality and may need to be featured more prominently in a blended signal.

In block 314, the signal blending service 166 may determine contextual information based at least in part on one or more of the characteristics of the ambient-sound signal, characteristics of the non-ambient-sound signal, the sensor information, the operation information, the source information, and/or the network information (e.g., as determined by the signal blending service 166 in one or more of block 302-312). As described, the contextual information may indicate one or more conditions, states, or other information regarding the ambient-sound signal, the non-ambient-sound signal, and/or the audio computing device 102a. The signal blending service 166 may utilize such contextual information to identify a set of modifications, from a set of modification rules, that the signal blending service 166 may apply to the non-ambient-sound signal and/or the ambient-sound signal (e.g., as described with reference to block 206 of the routine 200 illustrated in FIG. 2). The signal blending service 166 may return to performing operations of the routine 200.

Figure 4:
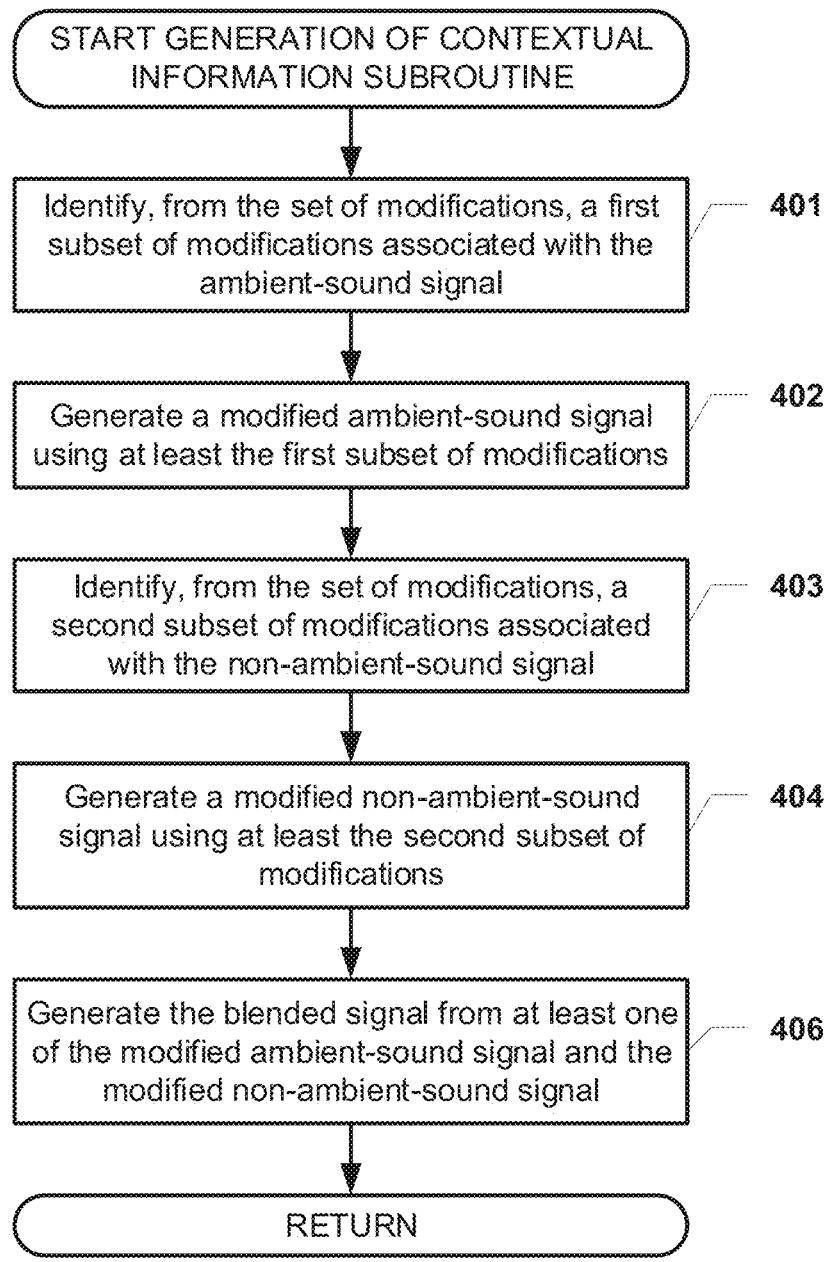
FIG. 4 is a process flow diagram illustrating an embodiment computer-implemented method for modifying at least one of an ambient-sound signal or a non-ambient-sound signal based on contextual information, according to some embodiments.

FIG. 4 is a flow diagram of an illustrative subroutine 208a for generating a blended audio signal from at least portions of an ambient-sound signal and a non-ambient-sound signal, according to some embodiments. In some embodiments, the subroutine 208a may be implemented by a signal blending service operating on an audio computing device (e.g., the signal blending service 166 of the audio computing device 102a as described with reference to FIG. 1B). In some embodiments, the operations of the subroutine 208a may implement embodiments of the operations described with reference to block 208 in the routine 200 (e.g., as described with reference to FIG. 2). Thus, in such embodiments, the signal blending service 166 may begin performing the method 208a in response to identifying a set of modifications in block 206 of the routine 200 (e.g., as described with reference to FIG. 2).

In block 401, the signal blending service 166 may identify, from the set of modifications identified in block 206, a first subset of modifications associated with the ambient-sound signal. In some embodiments, the first subset of modifications may include or otherwise describe one or more operations to perform and/or one or more modifications to apply to the ambient-sound signal based on the set of modification rules. For example, the first subset of modifications may include instructions for increasing the gain of an ambient-sound signal that includes human speech. In block 402, the signal blending service 166 may generate a modified ambient-sound signal using, at least in part, the first subset of modifications, such as by applying modifications to or performing operations on the ambient-sound signal as indicated or described by the first subset of modifications.

The signal blending service 166 may identify, from the set of modifications, a second subset of modifications associated with the non-ambient-sound signal, in block 403. In some embodiments, the second subset of modifications may include or otherwise describe one or more operations to perform and/or one or more modifications to apply to the non-ambient-sound signal based on the set of modification rules. In block 404, the signal blending service 166 may generate a modified non-ambient-sound signal using, at least in part, the second subset of modifications, such as by applying modifications to or performing operations on the non-ambient-sound signal as indicated or described by the second subset of modifications. In block 406, the signal blending service 166 may generate the blended signal from at least the modified ambient-sound signal and the modified non-ambient-sound signal. The signal blending service 166 may then cease performing the operations of the subroutine 208a and may resume performing operations of the routine 200 by causing output of the blended signal in block 210 (e.g., as described with reference to FIG. 2).

While the signal blending service 166 is described in some embodiments as generating a blended audio signal, in some alternative embodiments, the signal blending service 166 may playout the modified ambient-sound signal and/or the modified non-ambient-sound signal without generating a separate, blended sound signal. In such embodiments, the modified ambient-sound signal and/or the modified non-ambient-sound signal may be played out separately, such as via different sound channels or different speakers included in the audio computing device 102a.

Figure 5:
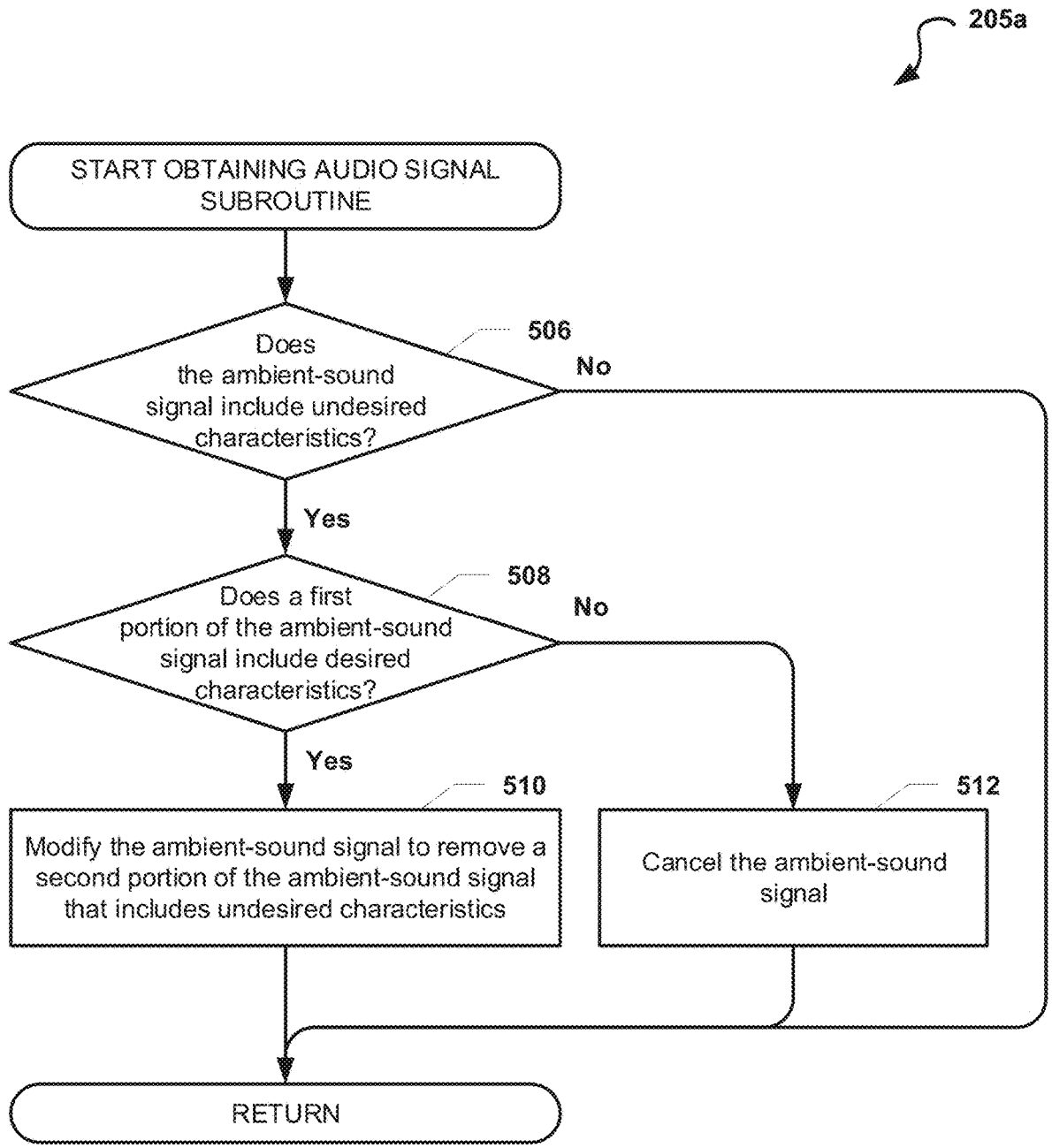
FIG. 5 is a process flow diagram illustrating an embodiment computer-implemented method for dynamically modifying an audio signal prior to blending the audio signal with another audio signal, according to some embodiments.

FIG. 5 is a flow diagram of an illustrative subroutine 205a for removing portions of an ambient-sound signal that includes undesired characteristics, according to some embodiments. In some embodiments, the subroutine 205a may be implemented by a signal blending service operating on an audio computing device (e.g., the signal blending service 166 of the audio computing device 102a as described with reference to FIG. 1B). In some embodiments, the operations of the subroutine 205a may implement embodiments of the operations described with reference to block 205 in the routine 200 (e.g., as described with reference to FIG. 2).

In determination block 506, the signal blending service 166 may determine whether the ambient-sound signal includes undesired characteristics. In some embodiments, the signal blending service 166 may determine that any sound other than human speech that is directed at the audio computing device 102a is undesired. For example, background noise, human speech that is not directed at the audio computing device 102a, and the like may be considered "noise" that may negatively impact the user's experience if played out. In such embodiments, the signal blending service 166 may analyze the ambient-sound signal to determine whether any portion of the ambient-sound signal includes undesired characteristics.

In response to determining that the ambient-sound signal does include undesired characteristics (i.e., determination block 506="YES"), the signal blending service 166 may determine whether a first portion of the ambient-sound signal includes desired characteristics, in determination block 508. For example, the signal blending service 166 may determine that at least one portion of the ambient-sound signal includes or represents human speech that is directed at the audio computing device 102a. In some embodiments, the signal blending service 166 may compare waveforms or other characteristics of the ambient sound signal against sound profiles, sound models, or other data structures that may include information associated with directed human speech. In such embodiments, the signal blending service 166 may determine whether at least the first portion of the ambient-sound signal includes or represents directed human speech based at least in part on the comparison of the ambient-sound signal to the sound profiles, sounds models, or the like.

In response to determining that the first portion of the audio signal does not include desired characteristics (i.e., determination block 508="NO"), the signal blending service 166 may cancel the ambient-sound signal, in block 512. In some embodiments, the signal blending service 166 may cancel the ambient-sound signal by generating another sound signal that is 180-degrees out of phase with the ambient sound signal and combining both signals. Alternatively (or additionally), the signal blending service 166 may reduce the ambient-sound signal's amplitude or gain to zero.

In response to determining that the first portion of the audio signal includes desired characteristics (i.e., determination block 508='YES"), the signal blending service 166 may modify the ambient-sound signal to remove a second portion of the ambient-sound signal that includes undesired characteristics. For example, the signal blending service 166 may cancel only those portions of the ambient-sound signal that do not represent directed human speech. In response to modifying the ambient-sound signal in block 510, cancelling the ambient-sound signal in block 512, or determining that the ambient-sound signal does not include undesired characteristics (i.e., determination block 506="NO"), the signal blending service 166 may cease performing operations of the subroutine 205a. The signal blending service 166 may then return to performing operations of the routine 200 (e.g., as described with reference to FIG. 2).

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method implemented on an audio computing device, comprising:
    obtaining an ambient-sound signal;
    obtaining a non-ambient-sound signal;
    determining contextual information related to the ambient-sound signal and the non-ambient-sound signal;
    identifying, from a set of modification rules and based at least in part on the contextual information, a first set of modifications related to the ambient-sound signal;
    identifying, from the set of modification rules and based at least in part on the contextual information, a second set of modifications related to the non-ambient-sound signal;
    generating a blended signal using at least the first set of modifications, the second set of modifications, the ambient-sound signal, and the non-ambient-sound signal;
    causing output of the blended signal;
    determining that a user touch input has been received by the audio computing device during output of the blended signal, wherein the user touch input pauses playback of the non-ambient sound signal;
    generating and storing a modified set of modification rules based at least in part on the user touch input, the contextual information, and the set of modification rules; and
    thereafter, generating a modified blended signal in accordance with the modified set of modification rules.

2. The computer-implemented method of claim 1, wherein the contextual information comprises information regarding at least one of:
    a characteristic of the ambient-sound signal;
    a characteristic of the non-ambient-sound signal;
    sensor information obtained from at least one sensor of the audio computing device;
    operational information regarding an operating state of the audio computing device; or
    network information regarding a state or condition of a network to which the audio device is connected.

3. The computer-implemented method of claim 1, wherein:
    obtaining the ambient-sound signal comprises obtaining the ambient-sound signal using a microphone of the audio computing device; and
    obtaining the non-ambient-sound signal comprises obtaining the non-ambient-sound signal from at least one of an internal memory of the audio computing device or an external computing device.

4. The computer-implemented method of claim 1, wherein identifying the first set of modifications comprises:
    providing the contextual information to an external computing device; and
    receiving the first set of modifications from the external computing device.

5. The computer-implemented method of claim 1, further comprising:
    determining updated contextual information based at least in part on the contextual information;
    identifying, from the modified set of modification rules and based at least in part on the updated contextual information, a third set of modifications related to the ambient-sound signal;
    identifying, from the modified set of modification rules and based at least in part on the updated contextual information, a fourth set of modifications related to the non-ambient-sound signal; and
    generating another blended signal using at least the third set of modifications, the fourth set of modifications, the ambient-sound signal, and the non-ambient-sound signal.

6. The computer-implemented method of claim 1, wherein generating the modified set of modification rules comprises:
    identifying a modification rule in the set of modification rules associated with the non-ambient-sound signal based at least in part on the contextual information;
    generating an updated modification rule based at least in part on the modification rule and the user touch input, wherein the updated modification rule indicates at least that playback of non-ambient-sound signals is to be paused; and
    replacing, in the set of modification rules, the modification rule with the updated modification rule.

7. A non-transitory, computer-readable medium having stored thereon computer-executable software instructions configured to cause a processor of an audio computing device to perform operations comprising:
    obtaining an ambient-sound signal;
    obtaining a non-ambient-sound signal;
    determining contextual information related to the ambient-sound signal and the non-ambient-sound signal;
    identifying, from a set of modification rules and based at least in part on the contextual information, a first set of modifications related to the ambient-sound signal;
    identifying, from the set of modification rules and based at least in part on the contextual information, a second set of modifications related to the non-ambient-sound signal;

generating a blended signal using at least the first set of modifications, the second set of modifications, the ambient-sound signal, and the non-ambient-sound signal;

causing output of the blended signal;

determining that a user touch input has been received by the audio computing device during output of the blended signal, wherein the user touch input pauses playback of the non-ambient sound signal;

generating and storing a modified set of modification rules based at least in part on the user touch input, the contextual information, and the set of modification rules; and thereafter, generating a modified blended signal in accordance with the modified set of modification rules.

8. The non-transitory, computer-readable medium of claim 7, wherein the contextual information comprises information regarding at least one of:

a characteristic of the ambient-sound signal;

a characteristic of the non-ambient-sound signal;

sensor information obtained from at least one sensor of the audio computing device;

operational information regarding an operating state of the audio computing device; or network information regarding a state or condition of a network to which the audio device is connected.

9. The non-transitory, computer-readable medium of claim 7, wherein the computer-executable software instructions are configured to cause the processor of the audio computing device to perform operations such that:

obtaining the ambient-sound signal comprises obtaining the ambient-sound signal using a microphone of the audio computing device; and obtaining the non-ambient-sound signal comprises obtaining the non-ambient-sound signal from at least one of an internal memory of the audio computing device or an external computing device.

10. The non-transitory, computer-readable medium of claim 7, wherein the computer-executable software instructions are configured to cause the processor of the audio computing device to perform operations such that identifying the first set of modifications comprises:

providing the contextual information to an external computing device; and receiving the first set of modifications from the external computing device.

11. The non-transitory, computer-readable medium of claim 7, wherein the operations further comprise:

determining updated contextual information based at least in part on the contextual information;

identifying, from the modified set of modification rules and based at least in part on the updated contextual information, a third set of modifications related to the ambient-sound signal;

identifying, from the modified set of modification rules and based at least in part on the updated contextual information, a fourth set of modifications related to the non-ambient-sound signal; and generating another blended signal using at least the third set of modifications, the fourth set of modifications, the ambient-sound signal, and the non-ambient-sound signal.

12. The non-transitory, computer-readable medium of claim 7, wherein the computer-executable software instructions are configured to cause the processor of the audio computing device to perform operations such that generating the modified set of modification rules comprises:

identifying a modification rule in the set of modification rules associated with the non-ambient-sound signal based at least in part on the contextual information;

generating an updated modification rule based at least in part on the modification rule and the user touch input, wherein the updated modification rule indicates at least that playback of non-ambient-sound signals is to be paused; and replacing, in the set of modification rules, the modification rule with the updated modification rule.

13. An audio computing device comprising:

a microphone;

a memory configured to store processor-executable instructions; and a processor in communication with the memory and the microphone and configured to execute the processor-executable instructions to perform operations comprising:

obtaining an ambient-sound signal;

obtaining a non-ambient-sound signal;

determining contextual information related to the ambient-sound signal and the non-ambient-sound signal;

identifying, from a set of modification rules and based at least in part on the contextual information, a first set of modifications related to the ambient-sound signal;

identifying, from the set of modification rules and based at least in part on the contextual information, a second set of modifications related to the non-ambient-sound signal;

generating a blended signal using at least the first set of modifications, the second set of modifications, the ambient-sound signal, and the non-ambient-sound signal;

causing output of the blended signal;

determining that a user touch input has been received by the audio computing device during output of the blended signal, wherein the user touch input pauses playback of the non-ambient sound signal;

generating and storing a modified set of modification rules based at least in part on the user touch input, the contextual information, and the set of modification rules; and thereafter, generating a modified blended signal in accordance with the modified set of modification rules.

14. The audio computing device of claim 13, wherein the contextual information comprises information regarding at least one of:

a characteristic of the ambient-sound signal;

a characteristic of the non-ambient-sound signal;

sensor information obtained from at least one sensor of the audio computing device;

operational information regarding an operating state of the audio computing device; or network information regarding a state or condition of a network to which the audio device is connected.

15. The audio computing device of claim 13, wherein the processor is configured to execute the processor-executable instructions to perform operations such that:

obtaining the ambient-sound signal comprises obtaining the ambient-sound signal using a microphone of the audio computing device; and obtaining the non-ambient-sound signal comprises obtaining the non-ambient-sound signal from at least one of an internal memory of the audio computing device or an external computing device.

16. The audio computing device of claim 13, wherein the processor is configured to execute the processor-executable instructions to perform operations such that identifying the first set of modifications comprises:
provviding the contextual information to an external computing device; and
receiving the first set of modifications from the external computing device.

17. The audio computing device of claim 13, wherein the processor is configured to execute the processor-executable instructions to perform operations further comprising:
determining updated contextual information based at least in part on the contextual information;
identifying, from the modified set of modification rules and based at least in part on the updated contextual information, a third set of modifications related to the ambient-sound signal;
identifying, from the modified set of modification rules and based at least in part on the updated contextual information, a fourth set of modifications related to the non-ambient-sound signal; and
generating another blended signal using at least the third set of modifications, the fourth set of modifications, the ambient-sound signal, and the non-ambient-sound signal.

18. The audio computing device of claim 13, wherein the processor is configured to execute the processor-executable instructions to perform operations such that generating the modified set of modification rules comprises:
identifying a modification rule in the set of modification rules associated with the non-ambient-sound signal based at least in part on the contextual information;
generating an updated modification rule based at least in part on the modification rule and the user touch input, wherein the updated modification rule indicates at least that playback of non-ambient-sound signals is to be paused; and
replacing, in the set of modification rules, the modification rule with the updated modification rule.

19. The audio computing device of claim 13, further comprising:
a speaker through which the blended signal is output as sound, and
wherein the audio computing device is configured as a personal audio device that is removably coupleable to an ear of a user to position the speaker in proximity of the user's ear canal.

* * * * *